F. S. INGOLDSBY.
HARVESTER FOR BEETS AND OTHER ROOT CROPS.
APPLICATION FILED AUG. 12, 1912.
1,111,538.
Patented Sept. 22, 1914.
3 SHEETS—SHEET 1.
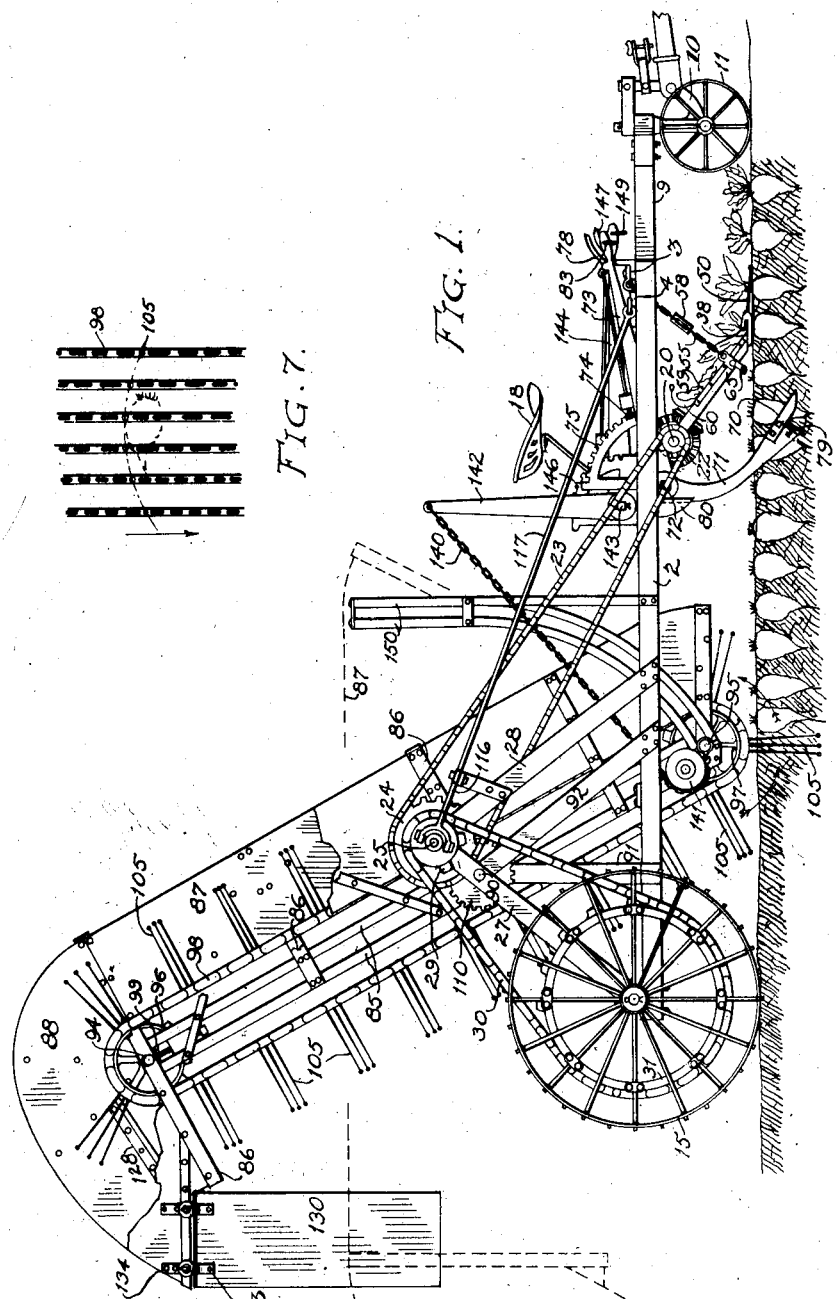

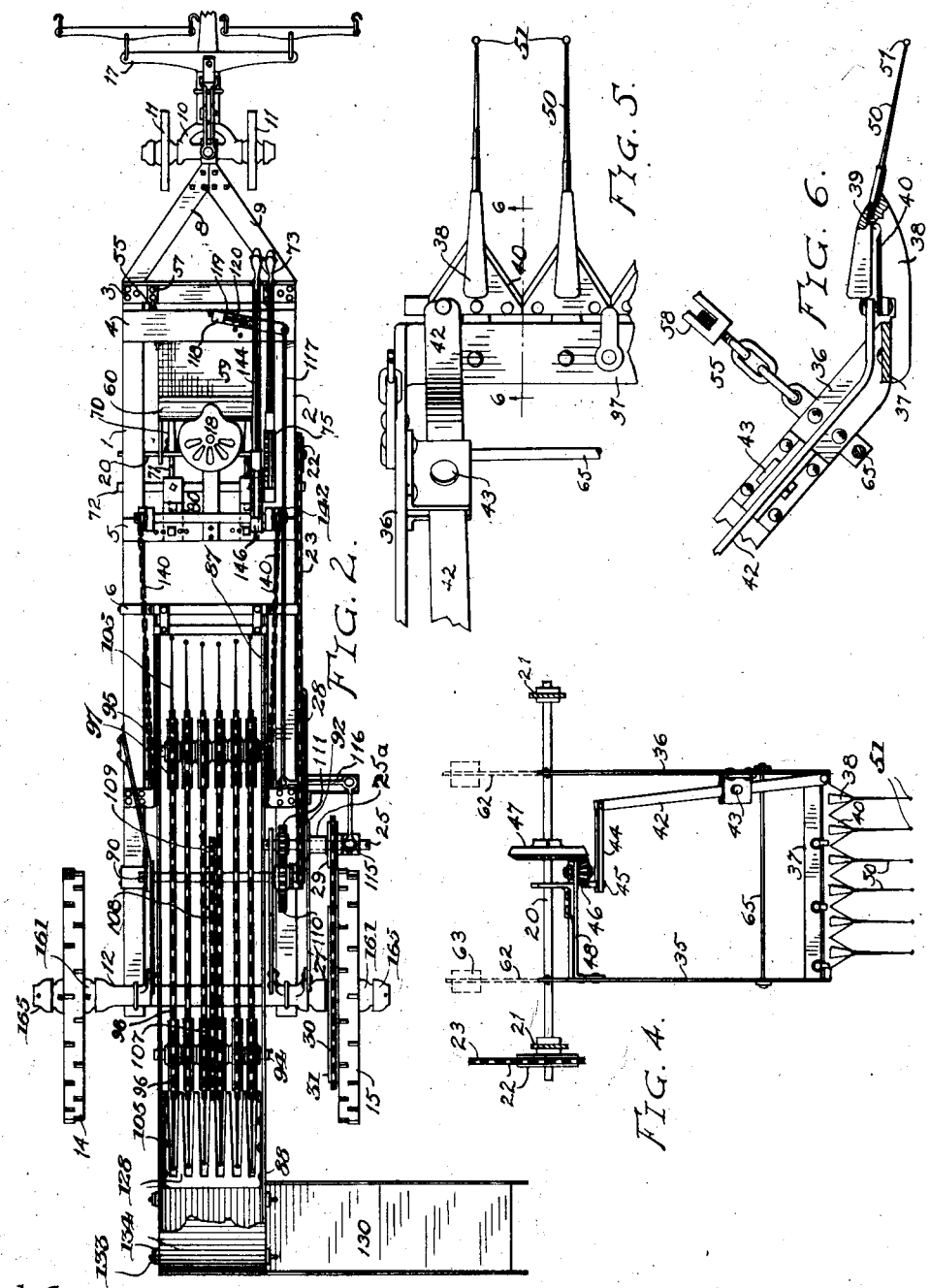

F. S. INGOLDSBY.
HARVESTER FOR BEETS AND OTHER ROOT CROPS.
APPLICATION FILED AUG. 12, 1912.
1,111,538.
Patented Sept. 22, 1914.
3 SHEETS—SHEET 3.
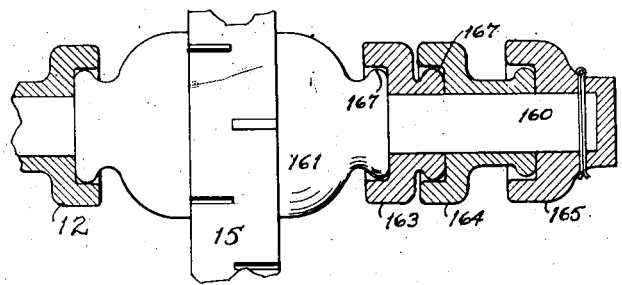
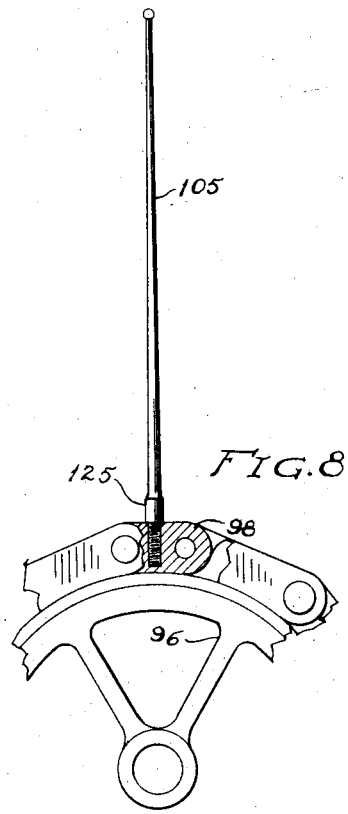
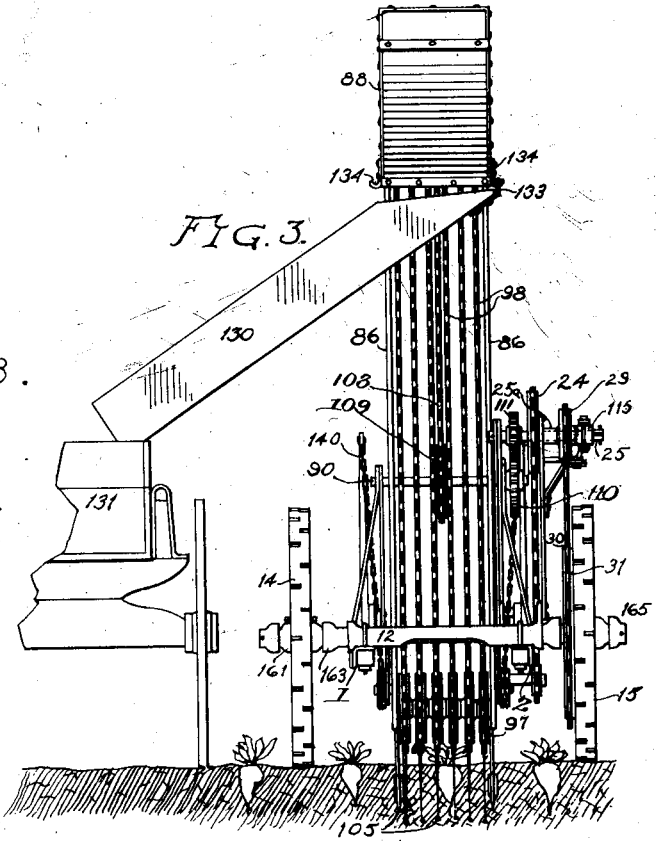

UNITED STATES PATENT OFFICE.

FRANK S. INGOLDSBY, OF PINE LAKE, MICHIGAN.

HARVESTER FOR BEETS AND OTHER ROOT CROPS.

1,111,538.  Specification of Letters Patent.   Patented Sept. 22, 1914.

Application filed August 12, 1912. Serial No. 714,553.

*To all whom it may concern:*

Be it known that I, FRANK S. INGOLDSBY, a citizen of the United States, residing at Pine Lake, in the county of Oakland and State of Michigan, have invented a certain new and useful Improvement in Harvesters for Beets and other Root Crops, of which the following is a full, clear, and exact description, reference being had to the accompanying drawings.

This invention relates to a machine adapted to be propelled over any suitable root crop and automatically remove the tops thereof and dig up, dry clean and load the bulbs or roots.

The invention is well adapted for embodiment in a machine adapted for the harvesting of sugar beets; hence, for brevity, but without limiting the invention thereto, I call the machine a beet harvester. In my harvesting operation the tops may be cast aside on the ground, or elevated with the bulbs or roots, and the bulbs or roots are dug up, following the removal of their tops, and elevated, and dry cleaned during the elevation, and may then be automatically discharged into a suitable receptacle.

The present invention comprises the means by which I accomplish these results and consists broadly of a wheeled vehicle having a topper for removing the foliage of a row, a pair of plows or ground looseners on opposite sides of the row; and a combined puller, cleaner and loader for removing the topped and loosened roots or bulbs, raising and cleaning them and discharging them. Numerous features of such machine, contributing to its adaptability, efficiency and economy are included within my invention, as set out in the claims hereof.

The invention includes also the more particular embodiment of the invention illustrated herein and hereinafter more fully described, it being premised that I do not limit myself to the particular construction shown further than the appended claims and the state of the art require.

In the drawings, Figure 1 is a side elevation of my beet harvester; Fig. 2 is a plan thereof; Fig. 3 is an end view of the same; Fig. 4 is a plan of one form of topping mechanism which may be employed; Fig. 5 is an enlarged plan of a portion of such topping mechanism near its lower right hand corner; Fig. 6 is a vertical section through the topping mechanism; Fig. 7 is a fragmentary elevation of the portion of the puller mechanism illustrating the scoop arrangement of the tines carried by its chains; Fig. 8 is a detail, being an enlarged side elevation of one of the pulling tines with a portion of the chain carrying the same and a sprocket wheel on which the chain rides; Fig. 9 is a detail illustrating the means for changing the gage of the wheels according to the distance between rows of beets, the same being an edge view of a portion of the wheel showing its hub in elevation and the spacing sleeves in cross section.

Referring to Figs. 1, 2 and 3 of the drawing, the frame of the machine consists of longitudinal side bars 1 and 2, various cross bars as 3, 4, 5 and 6, the tubular rear axle housing 12, and the diagonal front bars 8 and 9, which are the bent ends of the side bars 1 and 2 and connected together at their forward ends. The frame is preferably of metal and may be made of commercial shapes, as angle irons, bars, etc., secured by rivets or bolts, as is well understood. At the forward end this frame is suitably pivoted to the front axle 10 carrying the front wheels 11. The front wheels are preferably small enough so that they may pass underneath the framework and completely clear it, enabling convenient turning and guiding. Near the rear portion of the frame is the rear axle housing 12, referred to, from which projects an axle loosely or rigidly, as the motive power may require, carrying the rear wheels 14 and 15.

If the machine is to be propelled by animal power, the rear wheels may be loose on the axle, and suitable draft rigging, indicated at 17, is connected with the forward end of the main frame and with the front axle, as illustrated in the drawing. If, on the other hand, the machine is to be propelled by motive power, the draft rigging is removed and a suitable engine or motor is mounted on the frame and connected with one of the rear wheels, in which case they are rigidly attached to the axle. Such engine may conveniently be mounted on the diagonal frame ends 8 and 9 and connected by a sprocket chain with the wheel 14, if desired. In such case, of course, suitable means for steering the forward wheels are provided.

Carried by the machine frame and projecting below it are the topping mechanism, the plows and the combined puller, cleaner and loader. As the topping mechanism acts first on the crop to be removed, I will first describe it, with particular reference to the form of topping mechanism shown in Figs. 1 to 6 inclusive. Later I will describe certain modifications of this topping mechanism, which may be employed if desired.

Referring now to the figures mentioned, 20 indicates a transverse shaft extending beneath the main frame and supported by suitable brackets 21 (Fig. 4) depending from the main frame. On this shaft is a sprocket wheel 22 over which extends a sprocket chain 23 leading from a sprocket wheel 24. The latter wheel is rigid on a shaft 25 lying transversely above the frame and supported by the struts 27 and 28. This shaft, as hereinafter explained, may be clutched to a sprocket wheel 29 loose on the shaft and carrying a sprocket chain 30 which extends around a sprocket wheel 31 bolted or otherwise secured to the drive wheel 15. Accordingly, when the clutch is in engagement and the machine propelled over the ground, the shaft 20 is continuously rotated.

As shown in Figs. 1 to 6, loosely mounted on the shaft 20 are two arms 35 and 36 of a U-shaped bar, the lower end of which forms a cross bar 37, such bar constituting, in effect, a floating U-shaped frame. Secured to the cross bar 37 are a series of forwardly projecting shoes 38 having horizontal openings 39 through which extends the transverse knife bar 40 having triangular forwardly pointing knives, after the manner of a mowing machine. This knife bar is connected with the forward end of a lever 42 pivoted intermediately at 43 to an arm 36 and at its upper end connected by a link 44 with a crank pin 45 on a bevel pinion 46 which meshes with the bevel gear 47 on the shaft 20. The pinion 46 is shown as journaled on a stud carried by a cross bar 48 secured to the arm 35 and loosely hung on the shaft 20. From this mechanism it results that, as the machine is propelled forwardly, the knife bar 40 reciprocates horizontally and is adapted to cut off the foilage of the crop over which the machine passes.

To raise the foilage so that the knife bar will be effective in cutting it, I secure to the forward end of each shoe 38 a forwardly and downwardly projecting tine 50. The forward ends of these tines lie close to the ground, and incline upwardly and rearwardly therefrom, and thus operate to engage underneath any drooping or recumbent portions of the foliage, raising the same so that the knives act thereon and effectively sever such foliage from the roots. The tines 50 being more or less flexible and elastic, not only raise the recumbent foliage, but, to a certain extent, take care of side obstructions, inasmuch as the tine is deflected thereby and the following stiffer shank of the tine shoves against the obstruction and pushes it sidewise out of the way, or the shoe is raised thereby to pass over it, as the case may be.

The tines 50 have balls 51 on their points so that they can not stick into or injure a root. On the other end of the tines screw into threaded openings in the forward end of the shoes, and in front of these openings the tines have enlarged shoulders, so that they can not break off short and plug the openings. If there is any breakage, it will be in front of the shoulder and the remaining shoulder provides a convenient place for the application of a wrench to unscrew the remaining portion of the tine. To prevent these downwardly projecting tines or the shoes from becoming embedded in the ground or plants, I provide chains 55, the lower ends of which are secured to the arms 35 and 36, the upper ends to suitable eyes 57 carried by the cross bar 3 of the frame. These chains limit the downward movement of the shoes and tines while allowing them to play upwardly freely in passing over obstructions. The lengths of the chains are regulated by turn buckles 58, or other suitable mechanical adjustments.

A plate 59 may be attached to and cover the topper frame, and if desired this plate may be provided at its upper end with a bent or trough-like portion 60, as shown in the drawings. The purpose of these parts is to make a baffle for the foliage to impinge against and help to force the same toward the sides of the vehicle, leaving the foliage along the sides of the rows harvested, where certain operators desire the foliage to be left. In practical operation, if the baffle plate and its trough should become clogged, it would be an easy matter for the driver on the seat 18 to remove the same by a movement of one of his feet, as the plate is directly below the natural position of his feet and easily accessible.

If it be desired to have the foliage and tops gathered up and loaded with the roots or bulbs, the plate 59 and its trough 60 are simply omitted and the tops accordingly fall over behind the topper and lie on the ground, to be raised by the puller, hereinafter described.

To make it possible to adjust the amount of the weight of the topper which rests on the ground and thus insure the topper passing with the desired lightness over the ground or obstructions, the topper may be counterweighted, as illustrated in dotted lines in Fig. 4, where the arms 35 and 36 extend to the rear of the shaft 20, as shown at 62, and are provided with counterweights 63.

To loosen the soil on each side of the row of roots, I provide a pair of plows which are set as near or as far away from such row as desired. The plow shares are designated 70. They are carried on suitable arms 71, which are mounted on a rock shaft 72. Projecting forwardly from this rock shaft is a rock arm 73 for adjusting the position of the plow. This rock arm carries a slidable locking dog 74 coöperating with a stationary segment 75 and operated by a usual hand grip 78 pivoted to the lever. The plow points have their shanks preferably U-shaped in cross section, so that they extend onto opposite sides of the arms 71 and are thus doubly secured thereto. Underneath the plow points the arms are formed to receive chisel points, as shown at 79, the function of which is to force the plow into the ground at the beginning of the operation, this chisel point being the first to rest on the surface when the plow is let down and automatically doing the forcing as the machine is moved forward. A downward push of the operator on the plow lever 73 assists this operation and is the natural way to start the plowing. The plow shares may vary in size and shape and sets of them may go with each machine for use in varied service.

To prevent any backward motion of the plows or undue strain on the shaft 72, as well as to secure the position of the plow arms laterally, I provide a pair of abutments 80 which are carried by the frame cross bar 5 and are adapted to receive the rearward thrust of the plow arms, and are grooved on their under sides to constantly engage those arms near their pivots and thus hold them from lateral shifting. These lugs are adjustable in position, preferably by means of several holes in the cross bar, through a choice of which bolts may pass, so that the lugs with the plow arms may be changed in position to suit the desired position of the plows.

When the plows are to be removed from the ground, a slight backing of the machine loosens them, after which the operator raises them by means of the plow lever 73. In such raising action the plows engage the cross bar 65 of the topper and raise it to idle position. In this position the plow and topper are held by reason of the dog 74 engaging the notch in the segment 75. On the handle of the plow lever I may provide a bail or clip 83 to keep the dog out of action while the plow is being engaged or loosened from the ground.

I will now describe the puller, cleaner and loader, which, as a whole, is pivotally mounted on the rear portion of the vehicle. The frame of the puller, cleaner and loader consists of light but strong parallel bars 85, cross bars 86 and side wings 87, and the hood 88, all these parts being rigidly connected together. 90 indicates a cross shaft extending between the bars 85, which bars are hung on this shaft by a suitable bearing carried by them. The shaft is mounted in an upwardly extending portion of a frame provided by the strut 27, heretofore referred to, and a vertical strut 91 and a diagonal strut 92. The frame bars 85 carry at their upper and lower ends suitable boxes for shafts 94 and 95, on which are mounted a series of sprocket wheels 96 and 97 carrying a series of endless sprocket chains 98. Proper adjustment and tension is given to these chains by screws acting on the boxes on each end of the shaft 94, one of such screws being shown at 99 in Fig. 1. The chains 98, of which there may be any desired number (six being shown in the drawing), are mounted side by side and carry projecting tines 105, which, by reason of the movement of the chains, (downwardly on their rear reaches) are adapted to enter the ground at the rear of the beets and, by acting forwardly and upwardly thereon, after the manner of a pitch fork, serve to pull the beets from the loosened ground and carry them up the elevator provided by the chains, tines and side wings 87. To effect this, the movement of these tines 105 downwardly and forwardly and upwardly in the ground is more rapid than the corresponding forward movement of the machine. The mechanism for moving the chains will be described later.

The puller tines 105 are shaped similar to the topper tines 50 heretofore referred to. They are ball pointed, so that they will not injure the roots, and at their inner ends they are screw threaded into certain of the links of the chains 98. Just outside of this link they have enlargements 125 which prevent any breaking of the tine in a way which would plug the hole. The enlargement also insures the proper set of the tine in the chain and provides a convenient place where the tine may be grasped by a wrench, so that it, or the remaining portion of it, may be removed. The tines being elastic, will pass by obstructions in the ground much the same as the topper tines 50 heretofore mentioned.

By differently setting the sprocket wheels on the shafts 94 and 95, I may cause the tines to stand in an arcual course, as illustrated in Fig. 7, so that the group of tines constitute a sort of skeleton scoop, thus insuring the gathering of any roots which may be growing or be pushed away from the center line of the row being harvested. This scoop-like grouping of the tines is arranged on an arc suitable to the harvesting in hand, so that I have practically an endless chain of properly formed pitch forks for gathering up the roots or bulbs which such forks encounter,—together with the tops thereof, if the latter have been left on the ground by the omission of the baffle 59. The walls 87 prevent the gathered product falling off the tines, and, accordingly, this product is raised by the chains and tines. Now the arrangement of the inclined elevating chains 98 side by side by being spaced apart presents a grill-like support up which the bulbs or roots are carried, so that any soil may fall through the grill. This results in the cleaning of the beets or roots as they are being elevated, and this mechanism constitutes what I call the "dry cleaner" of my apparatus.

To receive the gathered product which is discharged at the upper end of the elevator, I provide the hood 88 heretofore referred to, which is a roofed over continuation of the side walls 87 and carries a supporting comb 128 between the bars of which the uppermost tines pass. This leaves the beets or roots supported on the comb and they roll gently down same and pass into the chute 130, which delivers them to a suitable wagon 131 traveling alongside of the harvester. To make this chute 130 so that it can be used either to the right or left of the harvester, I provide its upper end with eyes 133 adapted to hook onto either of two sets of hooks 134 secured on opposite sides of the hood 88. If desired to discharge the harvested beets directly onto the ground, the chute is simply removed.

To give the desired movement to the chains and tines, I secure the sprocket wheels 96 rigidly on the shaft 94 and on this shaft I mount an additional sprocket wheel 107 (Fig. 2) with which is connected an additional sprocket chain 108 meshing with a sprocket wheel 109 rigid on the shaft 90. A spur gear 110 on this shaft meshes with a gear 111 on the shaft 25, heretofore referred to. The sprocket wheel 29 heretofore referred to, which is connected by a sprocket chain with the drive wheel 15 is loosely mounted on the shaft 25 but is adapted to be clutched thereto by a clutch member 115, which is splined to the shaft and operatable by a bell crank 116 connected by a link 117 with an operating foot lever 118. When this foot lever 118 is moved rearwardly, the clutch is thrown into action and the drive wheel 15 is thus put into gear with the sprocket chains 98, so that, as the vehicle moves forwardly, these chains and their tines travel. The foot lever 118 may be locked in desired position by a small lever 119 mounted thereon operating a pin 120 which may be engaged in a properly positioned hole in the frame cross bar 4. The lever end 118 is shown as extending over the lever 119 to protect it from inadvertent action—the operator's toe may conveniently raise the lever 119 and his whole foot move the lever 118.

In the present design, I have selected such ratio of gearing that, while the machine is moving forward about the distance between adjacent groups of tines on the puller, any one group has moved from its position deepest in the ground to a horizontal position entering the upward passageway between the walls 87. It is self-evident, however, that any other proportion of speed may be made, as desired, by simply changing the relative sizes of the two gear wheels 110 and 111.

To provide for convenient travel of the machine when not harvesting, I arrange the puller, cleaner and loader to swing into substantially horizontal position, as illustrated by broken lines in Fig. 1. The mechanism being pivoted on the shaft 90, the greater weight is above the pivot, so it tends to assume the horizontal position. In action it is held in the inclined position by means of the chains 140 which are secured to the lower end of the puller frame preferably to the ends of the shaft 95 and extend over pulleys 141 supported on studs rigidly carried by the frame and then pass forwardly to arms 142 on a rock shaft 143. A lever 144 extends forwardly from this rock shaft and provides means for pulling or slackening on the chains. This lever 144 is locked by a suitable dog entering a stationary segment 146, the dog being operated by a hand grip 147 associated with the handle of the lever. A suitable bail or clip 149 on the lever may hold the retaining dog idle when desired. The lower end of the puller frame is guided by two pairs of curved guide bars 150 located respectively on opposite sides of the puller and carried by the frame of the vehicle. The shaft 95 extends into the space between the guide bars. In normal operative position the parts are as shown in Fig. 1. To swing the puller into horizontal position for transportation, the chute 130 is simply removed and the lever 144 released and swung upwardly to slacken on the chain 140.

To limit the digging depth of the tines 105, it is only necessary to block the downward movement of the lower end of the puller frame, which is easily accomplished by securing an abutment, as, for example, a temporary clamp across the bars 150 in suitable position below the shaft 95. To release these tines from the soil, the machine is backed slightly, as in the case of the plows. Hence, one backing releases everything.

Since root crops are planted with their rows of no standard distance apart, it is desirable to make the gage of the wheels 14 and 15 adjustable. I accomplish this by making the wheels laterally movable on their supporting axle and providing removable distance sleeves adapted to surround the axle either on the outer or inner sides of the wheel hubs, as the case may be. Thus, in the construction shown, the frame member 12 is a stationary tubular axle housing; and in this tube is an axle 160 (Fig. 9) projecting from each end of the tube and having mounted on it the hubs 161 of the wheels 14 and 15. Suitable removable distance sleeves 163 and 164 may stand between the inner ends of the hubs and the outer ends of the tubular axle housing, thus spacing the wheels on this axle, or such sleeves may be removed and placed on the outer sides of the hubs, thus bringing the wheels closer together. A series of such sleeves of different lengths may be employed. These are illustrated in Fig. 9 by 163 and 164. Suitable caps 165 are pinned to the axle at its ends and overhang the sleeves. Without confining myself to any special dimensions, I may say that I find it convenient to have the harvester straddle three rows of beets, and accordingly, for each inch of difference in the planting of the rows, there should be three inches of adjustment in the gage of the wheels to enable them to track midway between rows, and to effect this, there should be an inch and a half adjustment to each wheel. Accordingly, by making the sleeves of a length an inch and a half, three inches, four and a half, and six inches, I may obtain an assortment of different widths suitable for rows varying by inches.

It will be noted that each of the sleeves 163, 164 and the cap 165 have flanged ends projecting over the adjacent sleeve, and the sleeves nearest the hub, as well as the ends of the stationary axle housing, project over the hub. The hub and the opposite ends of the removable sleeves are made with beads 167, which not only strengthen them, but serve to make a close joint with the overhanging sleeve but also a baffle to keep out the dust and dirt.

The system of adjustment described does away with the necessity of any complex adjusting mechanism. There is nothing about the structure to get out of order and, if a sleeve should become broken or lost, a simple piece of pipe or piece of metal bent like a pipe may be temporarily substituted therefor. Adjustment of the rear wheels, as just described, requires adjustment of the sprocket wheels 29 so it will track correctly with the sprocket wheel 31, and to accomplish this in an easy and simple manner I provide a series of interchangeable spacing sleeves 25ᵃ corresponding in length to the rear wheel sleeves.

It will be seen that my machine is simple, accessible, easily repaired and is of the general character of mechanism to which farmers are accustomed, thus increasing its practicability in actual conditions. The repairs or replacements are easily made at any place, even out in the field, as a Stillson wrench is about the only tool required. Cotter pins and set screws are used for holding the various wheels, arms, shafts, etc., wherever feasible, enabling their convenient adjustment, removal and replacement. I have heretofore referred to the mechanism being driven by the main sprocket wheels 31 on the supporting wheel 15. This main sprocket wheel is preferably bolted to the wheel 15 in order to make easy repairs or replacements.

Having thus described my invention, what I claim is:

1. The combination, with a wheeled vehicle, of a series of endless chains carried thereby, means for moving said chains as the vehicle moves, and individual resilient tines projecting at intervals from each chain.

2. The combination, with a wheeled vehicle, of a series of inclined endless chains carried thereby side by side and spaced apart, means for moving said chains as the vehicle moves, and projecting resilient tines carried by said chains individually.

3. The combination, with a wheeled vehicle, of a series of endless chains carried thereby, means for moving said chains as the vehicle moves, and crop-lifting tines carried by said chains, said tines being arranged in arcual groups to have a position approximately that of the tines of a pitch fork.

4. The combination, with a movable vehicle, of a series of endless chains carried therein side by side and spaced apart and extending in an up and down direction, means for moving said chains as a unit consequent upon the vehicle movement, and resilient tines projecting from the chains at right angles thereto and adapted to act on root crops.

5. The combination, with a movable vehicle, of a series of endless chains carried therein side by side and spaced apart and extending in an up and down direction, means for moving said chains as a unit consequent upon the vehicle movement, tines projecting from the chains, and side walls on opposite sides of the elevating portion of the chains.

6. The combination of a vehicle, a series of endless chains carried thereby side by side separated from each other and located in a rearwardly and upwardly inclined direction, resilient tines projecting individually from said chains, means for moving the series of chains as a unit to cause the projecting members to pull up crops over which the vehicle travels and carry them upwardly along the grill provided by the spaced chains, and walls on opposite sides of such group of chains.

7. The combination, with a vehicle, of a combined puller, cleaner and loader carried thereby and consisting of an inclined frame supported by the vehicle, a series of endless chains side by side supported by said frame, tines projecting from said chains in groups out of transverse alinement.

8. In a harvester of the class described, the combination, with a wheeled vehicle, of a series of endless chains, and a series of tines carried thereby and adapted to act on the crop, said tines being each provided with a ball at its end.

9. In a harvester of the class described, the combination, with a wheeled vehicle, of a sprocket wheel and chain thereon and driven thereby, a series of tines carried by such chain and adapted to act on the crop, each tine being provided with a ball at its end, and with a screw thread at the other end, whereby it is held in a screw threaded socket in a link of the chain, each tine having a boss in front of the screw thread.

10. The combination with a wheeled vehicle, of a series of endless chains carried thereby side by side separated from each other, means for moving said chains as the vehicle moves, tines projecting individually from said chains, said tines being arranged in arcual groups to have a position approximately that of the tines of a pitch fork.

In testimony whereof, I hereunto affix my signature in the presence of two witnesses.

FRANK S. INGOLDSBY.

Witnesses:
ALBERT H. BATES,
BRENNAN B. WEST.